United States Patent
Lago

(10) Patent No.: US 8,302,765 B2
(45) Date of Patent: Nov. 6, 2012

(54) BAR CONVEYOR BELT, PARTICULARLY FOR THE FOOD INDUSTRY

(75) Inventor: Leopoldo Lago, Cittadella (IT)

(73) Assignee: Tecnopool S.p.A., San Giorgio in Bosco (PD) (IT)

( * ) Notice: Subject to any disclaimer, the term of this patent is extended or adjusted under 35 U.S.C. 154(b) by 0 days.

(21) Appl. No.: 13/144,931

(22) PCT Filed: Feb. 11, 2010

(86) PCT No.: PCT/IB2010/000264
§ 371 (c)(1),
(2), (4) Date: Jul. 19, 2011

(87) PCT Pub. No.: WO2010/092460
PCT Pub. Date: Aug. 19, 2010

(65) Prior Publication Data
US 2011/0297513 A1     Dec. 8, 2011

(30) Foreign Application Priority Data

Feb. 13, 2009  (IT) .................... VE2009A0014

(51) Int. Cl.
*B65G 13/02* (2006.01)
(52) U.S. Cl. ........................ 198/778; 198/848
(58) Field of Classification Search .................. 198/779, 198/850–853, 778, 848
See application file for complete search history.

(56) References Cited

U.S. PATENT DOCUMENTS

| | | | | |
|---|---|---|---|---|
| 2,776,045 A * | 1/1957 | Heinrichs | ...................... | 198/834 |
| 3,938,651 A * | 2/1976 | Alfred et al. | ................... | 198/778 |
| 4,565,282 A * | 1/1986 | Olsson et al. | ................. | 198/778 |
| 5,954,187 A | 9/1999 | Hager | | |
| 6,533,107 B2 * | 3/2003 | Suzuki et al. | ................. | 198/851 |
| 7,762,388 B2 * | 7/2010 | Lago | ............................. | 198/778 |
| 2008/0017483 A1 | 1/2008 | Lago | | |

FOREIGN PATENT DOCUMENTS

| | | |
|---|---|---|
| EP | 1010648 | 6/2000 |
| GB | 1066905 | 4/1967 |

* cited by examiner

*Primary Examiner* — James R Bidwell
(74) *Attorney, Agent, or Firm* — Themis Law

(57) ABSTRACT

A bar conveyor belt includes two parallel longitudinal chains and a plurality of bars forming the conveying surface and fixed at their ends to the successive links of the two chains. Each chain link consists of a metal plate bent in the form of a U with its arms disposed to define a space intended to partially house that adjacent link positioned upstream with reference to the chain advancement direction, the arms being provided with a longitudinal slot for passage of that bar connected to the downstream link, the outer arm presenting an appendix engageable by the teeth of a drive sprocket. The appendix of each link is bent in the chain advancement direction to form a tooth with a complete involute profile, and the end of each bar extends into the appendix and is fixed to the top thereof, after passing through two holes provided in the arms of the link and the slots provided in the arms of the upstream link.

5 Claims, 3 Drawing Sheets

BAR CONVEYOR BELT, PARTICULARLY FOR THE FOOD INDUSTRY

FIELD OF THE INVENTION

The present invention relates to a bar conveyor belt, particularly for the food industry.

BACKGROUND OF THE INVENTION

In the food industry, plants (ovens, dryers, refrigerators, etc.) are known provided with endless conveyor belts on which the products to be treated are placed.

These known conveyor belts essentially comprise a plurality of metal bars, welded at their ends to the links of chains driven along guides extending along a predetermined path within the plant interior.

To enable the belt to be driven along a curved path, the individual bars must not be fixed together such that they preserve their parallelism, but instead must be able to also assume a slightly angled relative position, this being achieved by forming in each link, rigid with a bar, a longitudinal slot in which the adjacent bar engages.

These known conveyor belts are driven by two different methods: one of these consists of pulling the longitudinal belt spirally wound about a rotating drum, to the lateral surface of which the belt adheres with an edge by friction caused by the combined effect of the winding and the pulling; the other method consists of engaging an edge of the belt with a drive sprocket applied to its support structure.

In the first case the links welded to the ends of the individual bars are arranged for friction coupling to the surface of the rotating drum; in the second case the links welded to the ends of the individual bars are provided with outwardly projecting appendices which form overall a sort of articulated rack in which the drive sprocket can engage.

Examples of conveyor belts driven by the first method are described for example in EP1010648 and in US59541, while examples of conveyor belts driven by the second method are described for example in Italian utility model application MI2005U000149 and in Italian patent application MI2006A001395.

Italian utility model application MI2005U000149 of the same applicant already describes a conveyor belt of the aforesaid type, in which each chain link consists of a shaped plate having a flat appendix engageable by the sprocket teeth. This plate does not present an involute profile, and determines unsatisfactory engagement with the sprocket teeth, resulting in friction and wear. Moreover, the flat shape of the appendices poorly withstands the large stresses in play, with the passage of time they deforming because of the thrusts exerted by the teeth of the drive sprocket.

U.S. Pat. No. 7,762,388-B2 of the same applicant partly overcomes the limits of the preceding solution by forming the appendix of each chain link with complete involute profile. This solution has partly reduced the drawbacks related to the unsatisfactory coupling between the chain links and the drive sprocket, but has not completely solved the problem of the limited power transmissible by the drive sprocket to the chain links, as the open shape of the link appendices itself represents a limit to the maximum stresses which can be impressed on the appendices without causing deformation and loss of the involute profile.

SUMMARY OF THE INVENTION

Consequently this known solution also presents limits relative to the maximum operative speed attainable and to the weight of the products to be conveyed.

These drawbacks are eliminated according to the invention, by a conveyor belt as described herein.

BRIEF DESCRIPTION OF THE DRAWINGS

A preferred embodiment of the present invention is described hereinafter with reference to the accompanying drawings, in which.

DETAILED DESCRIPTION OF EMBODIMENTS OF THE INVENTION

Figure 1:
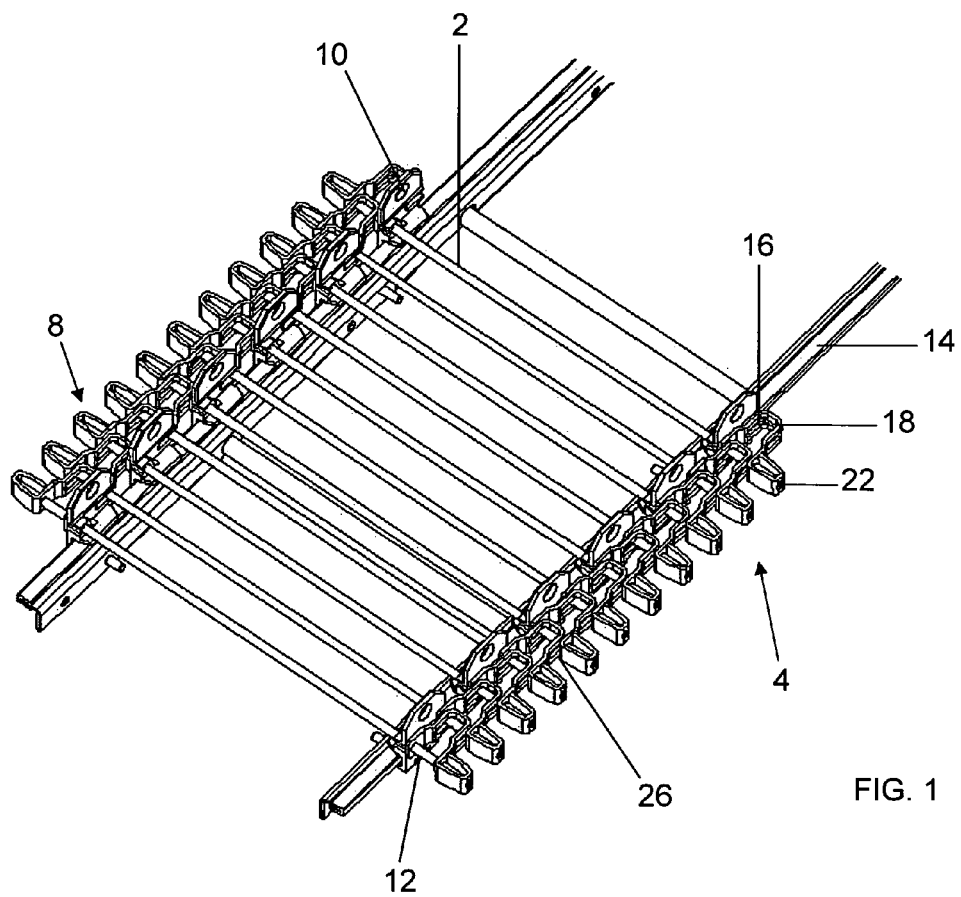
FIG. 1 shows a portion of the conveyor belt according to the invention.

As can be seen from the figures, the conveyor belt of the invention comprises a plurality of metal bars 2 formed of steel or of other material compatible with the nature of the plant to which the conveyor belt is to be applied.

Each bar 2 is connected at its ends to chain links 4 which overall form two articulated chains 6 and are associated with traditional inserts 8 made of suitable plastic material, and comprising a portion 10 emerging upperly from the upper surface of the conveyor belt to form a containing side wall, and a skid-shaped lower portion 12 for sliding the insert along a corresponding guide rail 14 of the entire conveyor belt.

Each link 4 of the chain 6 consists of a U-bent metal plate with an inner arm 16 close to the side wall 10 of the insert 8, and an outer arm 18.

The two arms 16 and 18 are not flat, but are shaped such that the link 4 has that portion close to the top of the U-shaped element narrower than the upstream portion, such as to enable partial co-penetration between the links, as shown in the drawings.

Figure 2:
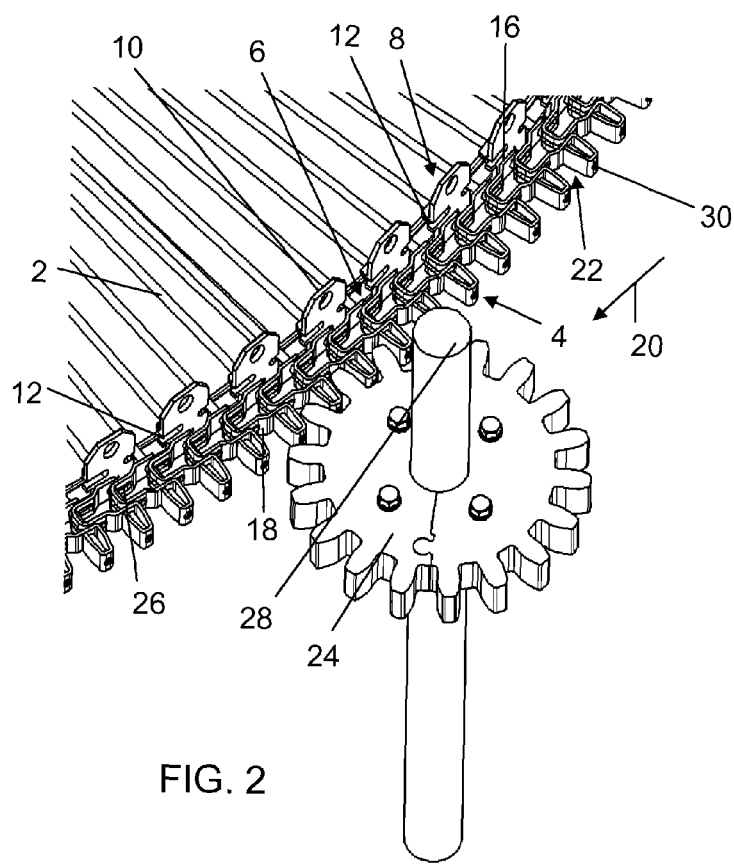
FIG. 2 is an enlarged perspective detailed view of the coupling between a belt portion and a drive sprocket.
Figure 4:
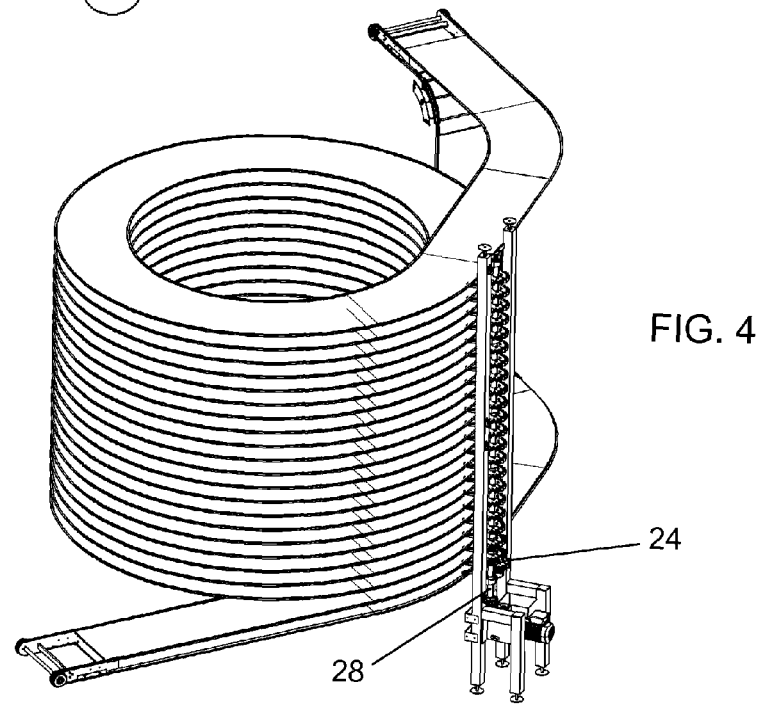
FIG. 4 shows it applied to a plant within the food industry.
Figure 3:
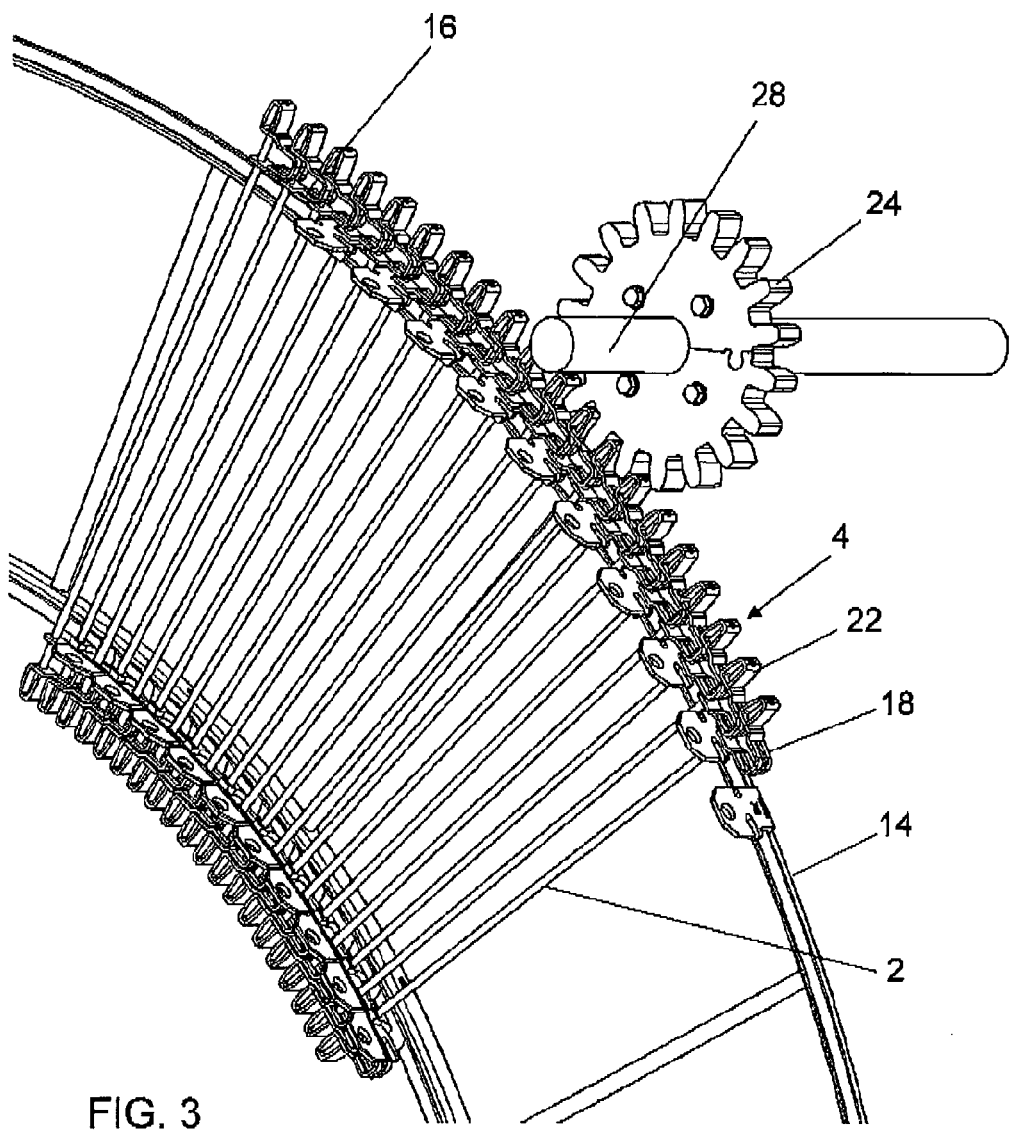
FIG. 3 shows it in perspective view.

Moreover, all the links 4 of each chain 6 are disposed such that the top of the U-shaped element is positioned downstream, with reference to the direction of advancement of the belt, indicated by the arrow 20 in FIG. 2.

The outer arm 18 of each link extends outwards to form an appendix 22, bent firstly outwards, then towards downstream, then inwards, until it rests on the outer surface of the same outer arm 18. This appendix 22 is of tooth shape, with complete involute profile, to form with the appendices 22 of all the other links 4 of the chain 6 a sort of articulated rack engageable by a drive sprocket 24 for the conveyor belt.

The connection between the ends of each bar 2 and the corresponding links 4 of the chain 6 is such that the bar 2 passes through a hole provided in the inner arm 16 of the link and a facing hole provided in the outer arm 18 of the same link, to abut against the inside of the top 30 of the appendix 22, the bar 2 also being welded to the inner arm 16, to the outer arm 18 and to the top of the appendix 22. However the welding to the outer arm 18 may not be necessary.

The articulated connection between adjacent links 4 is achieved by engaging that bar portion bounded by the two arms 16 and 18 of the downstream link 4 in longitudinal slots 26 provided in the narrow portion of the upstream link, partially housed in the wide part of the downstream link.

The operation of the conveyor belt of the invention is apparent from that described: rotating the shaft 28, to which the sprocket 24 is connected, results in rotation of the sprocket itself which, being coupled to the rack formed by the appendices 22 of all the links 4 of the chain 6, causes the chain to advance together with all the bars connected to it.

Moreover in contrast to known conveyor belts, the belt of the invention has spaces between the appendices 22 of adjacent links which are completely free, enabling the teeth of the sprocket 24 to more greatly penetrate into these spaces, making it possible to have at least three teeth simultaneously engaged.

This circumstance, which itself enables higher drive forces to be developed on the belt, but with relatively low stresses on the individual appendices 22, together with the fact that the substantial non-deformability of the appendices, due to their shape and to the presence in their interior of the end of the bars 2, enables the stress impressed on the individual appendix 22 to be substantially increased, results in a substantial increase in the load applicable to the conveyor belt. This means that:

greater operating speeds can be attained, heavier loads can be conveyed, more drive sprockets can act on the same conveyor belt and be spaced further apart, the shoes can be made of special materials enabling higher working temperatures to be achieved but having higher friction coefficients than traditional self-lubricating thermoplastic materials. In this respect, these materials generally have lower friction coefficients but cannot be used in environments in which the working temperatures exceed 100° C.

The invention claimed is:

1. A bar conveyor belt, comprising:

two parallel longitudinal chains and a plurality of bars forming a conveying surface and fixed at their ends to successive links of the two chains, each chain link comprising a metal plate bent in the form of a U with its arms disposed to define a space intended to partially house that adjacent link positioned upstream with reference to chain advancement direction, said arms being provided with a longitudinal slot for passage of that bar connected to a downstream link, an outer arm of the metal plate presenting an appendix bent to form a tooth with complete involute profile engagable by teeth of a drive sprocket, wherein the appendix of each link is bent in the chain advancement direction to form a tooth with complete involute profile, and wherein the end of each bar extends into said appendix and is fixed to a top thereof, after passing through two holes provided in the arms of said link and the slots provided in the arms of the upstream link.

2. A conveyor belt as claimed in claim 1, wherein a height and distance between the appendices of two adjacent links of each chain when in a traction state are such that engagement between said sprocket and said appendices simultaneously involves at least three successive teeth of said sprocket.

3. A conveyor belt as claimed in claim 1, a free end of the bent appendix extends until it rests on a lateral surface of the outer arm of the respective link.

4. A conveyor belt as claimed in claim 1, wherein each bar is welded to an inner arm and to a top of the appendix of each link.

5. A conveyor belt as claimed in claim 1, wherein each bar is also welded to the outer arm of each link.

* * * * *